(12) United States Patent
Sylvain

(10) Patent No.: US 8,164,615 B2
(45) Date of Patent: Apr. 24, 2012

(54) PERSONALIZED CONFERENCE BRIDGE

(75) Inventor: Dany Sylvain, Gatineau (CA)

(73) Assignee: Rockstar Bidco, LP, New York, NY (US)

( * ) Notice: Subject to any disclaimer, the term of this patent is extended or adjusted under 35 U.S.C. 154(b) by 1523 days.

(21) Appl. No.: 11/615,387

(22) Filed: Dec. 22, 2006

(65) Prior Publication Data

US 2008/0151785 A1    Jun. 26, 2008

(51) Int. Cl.
*H04N 7/14* (2006.01)

(52) U.S. Cl. ............. 348/14.08; 348/14.12; 379/202.01; 370/260

(58) Field of Classification Search ............... 348/14.09, 348/14.08, 14.12; 370/260, 261; 379/202.01
See application file for complete search history.

(56) References Cited

U.S. PATENT DOCUMENTS 6,330,022 B1 * 12/2001 Seligmann ................. 348/14.08
6,961,559 B1    11/2005 Chow et al.
2004/0125932 A1    7/2004 Orbach et al.

FOREIGN PATENT DOCUMENTS

| WO | 01/47224 A1 | 6/2001 |
| WO | 02/37803 A1 | 5/2002 |
| WO | 0237803 A2 | 5/2002 |
| WO | 03/075550 A1 | 9/2003 |

OTHER PUBLICATIONS

European Search Report for EP 07 02 4923, mailed Nov. 23, 2009.

* cited by examiner

*Primary Examiner* — Fan Tsang
*Assistant Examiner* — Simon King
(74) *Attorney, Agent, or Firm* — Withrow & Terranova, PLLC

(57) ABSTRACT

The present invention allows a user to customize her personal conference bridge such that conference participants who connect to the bridge are provided conference information selected by the user. In particular, after each conference participant gains access to the personal conference bridge, the conference information is delivered to a terminal of the conference participant. Although the user associated with the personal conference bridge may be a conference participant, delivery of conference information to the user is optional. The conference information may be any type of media content, or information identifying the location of media content to present to the conference participants.

27 Claims, 9 Drawing Sheets

PERSONALIZED CONFERENCE BRIDGE

FIELD OF THE INVENTION

The present invention relates to personal conference bridges, and in particular to allowing a user to customize their personal conference bridge such that conference participants who connect to the bridge are provided conference information selected by the user.

BACKGROUND OF THE INVENTION

Conference bridges are used to facilitate conference calls between two or more conference participants. In operation, multiple calls from multiple communication terminals are terminated at a conference bridge. In simpler conference bridges, the audio signals from each of the communication terminals are mixed together and provided back to each of the communication terminals. In more advanced conference bridges, the audio levels for the audio signals from the different communication devices are monitored and used to identify one or more of the audio signals to provide as an output to the communication devices. In general, the communication terminal or terminals providing the audio signals having the highest level at any given time are selected as the selected communication terminal. The audio signals from the selected communication terminals are mixed together and delivered all of the communication terminals in the conference. The audio signals from the unselected communication terminals are dropped, and thus, are not provided to the communication terminals. As such, only the audio signals provided by the selected communication terminals are presented to the communication terminals in the conference. At any given time, none of the participants will hear any participants other than those using the selected communication terminals. To avoid distractions, the audio signal from a selected communication terminal is generally not provided back to itself.

As communication technology evolves, the availability and use of conference bridges is dramatically increasing. In many corporate environments, many, if not all, employees are allocated a personal conference bridge. Service providers are also providing personal conference bridges to subscribers in large numbers. A given conference system may support virtually any number of personal conference bridges. A personal conference bridge allows an associated user to host a conference call to allow multiple conference participants to communicate with each at the same time. The user may or may not be a participant in a conference call hosted at her personal conference bridge.

Each personal conference bridge is assigned a unique access code, such as an extension, directory number, or telephony address. Conference participants use the access code, and perhaps a password or code, to gain access to the personal conference bridge. Since the personal conference bridges are generally supported in large numbers by a conference system, the access codes for the numerous personal conference bridges are similar in nature. Since the personal conference bridges are often always active, a conference participant can misdial an access code and enter another personal conference bridge. Accessing the wrong personal conference bridge may lead to interrupting another conference or waiting indefinitely for the other conference participants to join in the conference. In many instances, conference participants are not actually joined into the conference until the host or chairperson has joined; therefore, such waiting may not provide an indication of the error. Further, the automated announcement provided when accessing any personal conference bridge in a given conference system generally sounds the same, regardless of whose personal conference bridge is being used. As such, these announcements provide little or no warning to those conference participants who access the wrong personal conference bridge.

As with any personal communication mechanism, users often want to personalize greetings, announcements, and the like that are routinely presented to others. For example, it is commonplace for users to personalize voicemail greetings, out-of-office alerts, and the like. Given the personalized nature of personal conference bridges and the uniform nature of current conference announcements, there is a need for a mechanism to allow personalization or like customization of personal conference bridges. Such customization would also alert conference participants who access the wrong personal conference bridge of their error as well as provide confirmation to those conference participants joining a conference that they have joined the right conference.

SUMMARY OF THE INVENTION

The present invention allows a user to customize her personal conference bridge such that conference participants who connect to the bridge are provided conference information selected by the user. In particular, after each conference participant gains access to the personal conference bridge, the conference information is delivered to a terminal of the conference participant. Although the user associated with the personal conference bridge may be a conference participant, delivery of conference information to the user is optional. The conference information may be any type of media content, or information identifying the location of media content to present to the conference participants. The media content may include any one or a combination of text, graphics, image, voice, audio, or video content, depending on the capabilities of the personal conference bridge and the conference participant terminals. The media content may remain relatively static or may be dynamically updated on a conference-by-conference basis.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows a user to customize her personal conference bridge such that conference participants who connect to the bridge are provided conference information selected by the user. In particular, after each conference participant gains access to the personal conference bridge, the conference information is delivered to a terminal of the conference participant. Although the user associated with the personal conference bridge may be a conference participant, delivery of conference information to the user is optional. The conference information may be any type of media content, or information identifying the location of media content to present to the conference participants. The media content may include any one or a combination of text, graphics, image, voice, audio, or video content, depending on the capabilities of the personal conference bridge and the conference participant terminals. The media content may remain relatively static or may be dynamically updated on a conference-by-conference basis.

For example, as conference participants gain access to the personal conference bridge of the user, the personal conference bridge may sequentially deliver a uniform resource locator (URL) pointing to a picture of the user as well as stream a personalized greeting provided by the user, a video announcement, and a music selection to the terminals of each of the conference participants. The personalized greeting, the video announcement, and the music selection are sequentially presented to the conference participants through their respective terminals. Each terminal will use the URL to access the picture of the user and present the picture of the user to the respective participants. Alternatively, a simple audio announcement may be presented to the conference participants once they gain access to the personal conference bridge.

Figure 1:
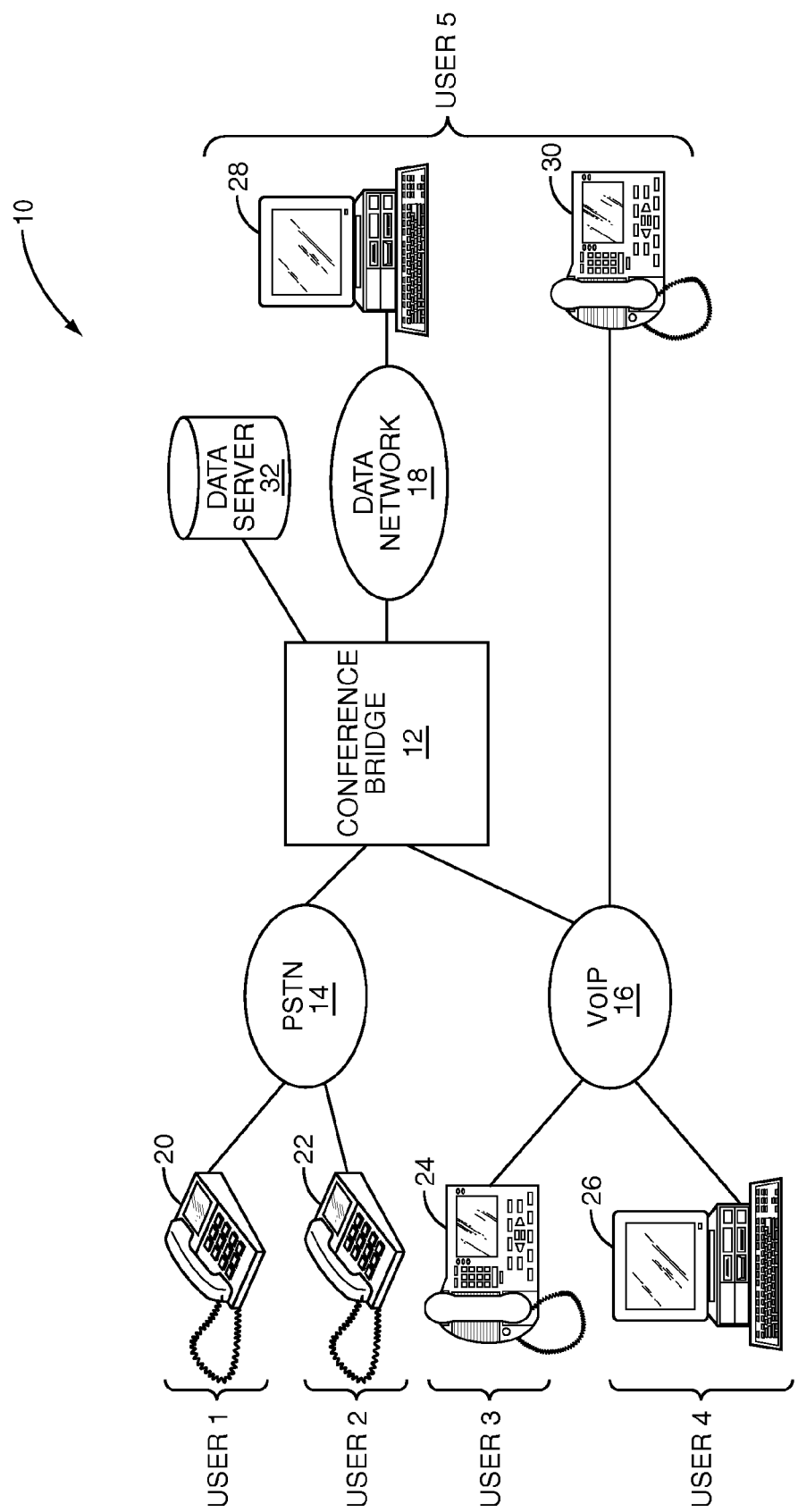
FIG. 1 is a block representation of a conference environment according to one embodiment of the present invention.

Prior to delving into further details of the present invention, an overview of a communication environment 10 in which the present invention may be employed is described in association with FIG. 1. As illustrated, a conference bridge 12 is capable of supporting conferences involving various conference participants via any number of communication networks, such as the Public Switched Telephone Network (PSTN) 14, a voice-over-Internet Protocol (VoIP) network 16, as well as a packet-based data network 18. Those skilled in the art will recognize various types of wired or wireless communication networks that support packet-based or circuit-switched communications in which the concepts of the present invention may be employed. In particular, the VoIP Network 16 is merely an example of a voice-over-packet network. Any voice-over-packet network technology may benefit from the present invention.

Users 1-5 are depicted as being associated with various types of communication terminals, which for clarity are described as either telephony terminals or computing terminals. Those skilled in the art will recognize that a communication terminal may be a dedicated telephony terminal, a dedicated computing terminal, or a hybrid thereof, and may include any type of fixed or mobile telephone, personal computer, personal digital assistant, or the like. As depicted, User 1 is associated with a telephony terminal 20 and User 2 is associated with a telephony terminal 22, both of which are supported by the PSTN 14. User 3 is associated with a telephony terminal 24, and User 4 is associated with a computing terminal 26, both of which are supported by the VoIP network 16. User 5 is associated with two communication terminals, a computing terminal 28 and a telephony terminal 30. The computing terminal 28 is supported by the data network 18, while the telephony terminal 30 is supported by the VoIP network 16. For the purposes of illustration only, assume the conference bridge 12 provides one or more personal conference bridges, one of which is allocated to User 5. Thus, the conference bridge 12 provides a personal conference bridge for User 5. The personal conference bridge may allow User 5 to host conference calls involving any conference participants, which may include users 1-4.

As indicated above, the present invention allows a user, such as User 5, to customize her personal conference bridge such that the conference participants who connect to the bridge are provided with conference information that was selected by the user. The conference information provided to those conference participants who access the personal conference bridge may be provided by one or more data servers 32, which are accessible by the conference bridge 12 in a direct or indirect fashion. Although the data server 32 is shown as being directly connected to the conference bridge 12, this orientation is only provided to represent a logical connection or accessibility. The data server 32 may be supported by the data network 18 or other network through which the conference bridge 12 may gain access to the conference information selected by the user. Alternatively, the data server 32 can be embedded within the conference bridge 12.

In other embodiments, the conference bridge 12 may access other entities, including communication terminals associated with the user or other entity. Thus, the conference bridge 12 may store or access virtually any other database or server to obtain conference information that is identified by the user, to provide to conference participants once they gain access to the personal conference bridge provided by the conference bridge 12. For clarity in the remaining discussion, the personal conference bridge for User 5 will be referred to as simply the conference bridge 12. Those skilled in the art will recognize that the conference bridge 12 may operate to provide only one personal conference bridge or multiple personal conference bridges for multiple users.

Depending on the capabilities of the conference bridge 12, as well as the communication terminals associated with the various conference participants, the conference information may include or identify virtually any type of media content that may be presented to the conference participants via an associated communication terminal. The communication terminal to which the conference information is provided may be the communication terminal through which the conference participant is accessing the conference bridge 12. Alternatively, the confirmation information may be sent to a communication terminal that is associated with a conference participant, but is not being used to access the conference bridge 12.

The media content provided in the conference information or identified by the conference information may correspond to text, graphics, image, voice, audio, or video content, which is selected from any source or personally created by the user. For example, the user may record a personalized greeting, and identify a favorite song to play to conference participants while they are on hold and waiting for the conference to begin. If actual media content is not provided in the conference information, the conference information may include a URL, uniform resource identifier, address, pointer, or the like to media content. As such, upon receipt of the conference information, the communication terminal associated with the conference participant may access the media content based on the conference information and then present the media content to the conference participant. Regardless of whether the media content is delivered to the conference participant by the conference bridge 12 or accessed by the communication terminal of the conference participant in light of the conference information, the conference participant receives customized media content that was selected by the user associated with the conference bridge 12. The essence of the present invention is providing the user with flexibility in providing conference information to the conference participants. Those skilled in the art will recognize the tremendous flexibility imparted by the present invention, and that the examples provided herein are merely exemplary and are not intended to limit the invention in any manner.

In addition to storing conference information, whether it is media content or information identifying media content, the data server 32 may provide a user profile that controls customization of the conference bridge 12 for User 5. If the profile is not stored in the data server 32 or a like database or server, the profile may be stored at the conference bridge 12. The profile will generally dictate when and how to provide conference information to the various conference participants as they gain access to the conference bridge 12. Multiple profiles may be maintained for a given user, such that a different customization of the conference interface is provided based on various criteria, including the date, time of day, conference participants, and the like. Further, different conference information may be provided to different conference participants for a given conference. As such, there is tremendous flexibility in maintaining a static profile for all conferences, or dynamically customizing the conference interface on a conference-by-conference or participant-by-participant basis.

Turning now to FIGS. 2A and 2B through 4A and 4B, multiple communication flows are provided to illustrate different customization scenarios. In each of these scenarios, the conference bridge 12 is providing a personal conference bridge for User 5. In the different scenarios, different ones of users 1-4 gain access to the conference bridge 12 for a conference, and once access is granted, conference information is provided to the corresponding users via their communication terminals. The type of conference information provided to the communication terminals varies based on the capabilities of the respective communication terminals throughout the different communication flows. In each case, User 5 is also a conference participant, and is the last participant to join the conference. As conference participants other than User 5 access the conference bridge 12, they are effectively placed on hold until User 5, the chairperson, joins the conference. When the chairperson joins the conference, the conference bridge 12 effectively joins all of the conference participants in conference. In another embodiment, the conference participants could receive the conference information when accessing the conference and then join the conference, even though the chairperson has not joined the conference yet. Similarly, conference participants accessing the conference after the chairperson has joined could receive the conference information and then join the conference.

Figure 2A:
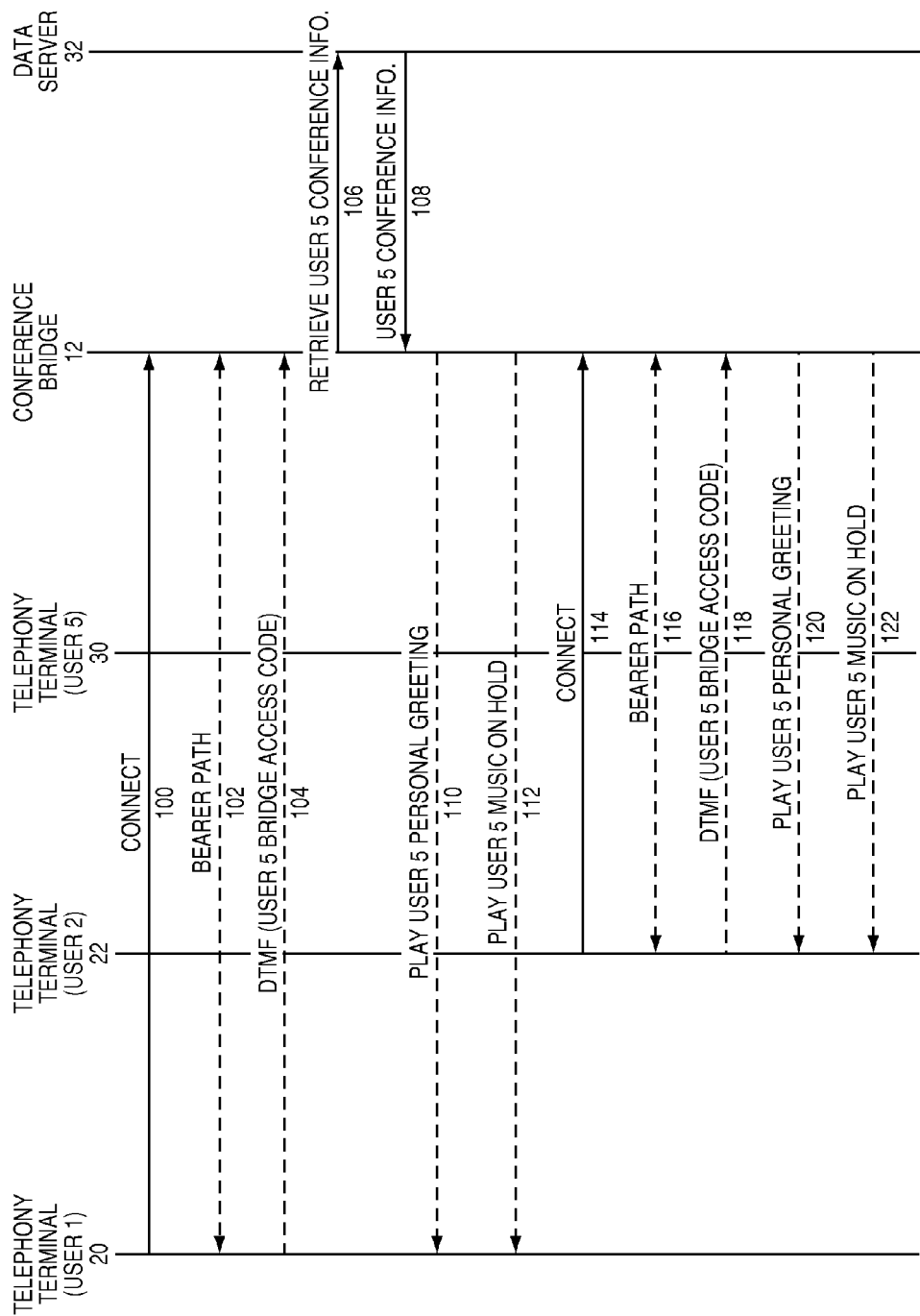
FIGS. 2A and 2B show a communication flow diagram illustrating operation of one embodiment of the present invention.
Figure 2B:
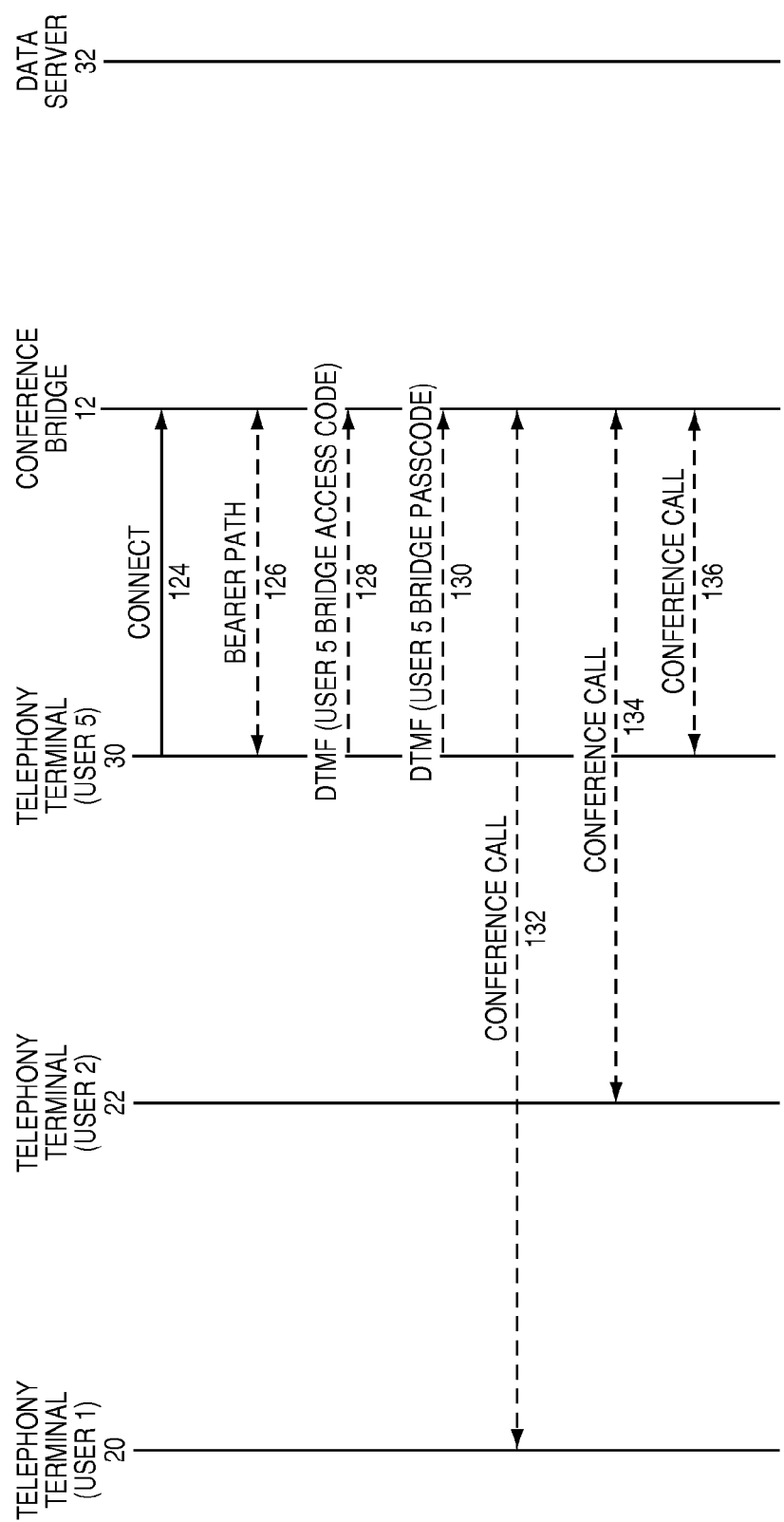

With reference to FIGS. 2A and 2B, assume the conference bridge 12 is configured to provide a prerecorded personal greeting, and then play selected music to each of the conference participants (User 1 and User 2) as they access the conference bridge 12. The personal greeting is a voice-based personal greeting. The personal greeting and the music are presented over the bearer path connecting the conference bridge 12 to the respective telephony terminals 20 and 22 via the PSTN 14.

Initially, the telephony terminal 20 of User 1 will connect to the conference bridge 12 (step 100), wherein a bearer path is established between the conference bridge 12 and the telephony terminal 20 (step 102). User 1 will enter an access code identifying the personal conference bridge of User 5, and the telephony terminal 20 will deliver dual-tone multi-frequency (DTMF) digits corresponding to the access code to the conference bridge 12 over the bearer path (step 104). The conference bridge 12 will grant User 1 access to the personal conference bridge of User 5, as well as send a message to the data server 32 to retrieve conference information for User 5 (step 106). The data server 32 will access the conference information for User 5 and provide it to the conference bridge 12 (step 108). In this instance, the conference information includes the media content for the personal greeting and selected music to present to the conference participants. As such, the conference bridge 12 will begin playing the personal greeting for User 5 over the bearer path connecting to telephony terminal 20 (step 110). When the personal greeting is completed, the conference bridge will begin playing the selected music over the bearer path to telephony terminal 20 (step 112).

In similar fashion, User 2 may initiate a connection to the conference bridge 12 for the conference via telephony terminal 22 (step 114), and a bearer path is established between the conference bridge 12 and the telephony terminal 22 (step 116). User 2 will enter the access code for User 5's personal conference bridge (step 118), and the conference bridge will associate the connection with the personal conference bridge and begin playing the personal greeting over the bearer path connected to telephony terminal 22 (step 120). Once the personal greeting is complete, the conference bridge 12 will begin playing the select music over the bearer path connected to telephony terminal 22 (step 122).

At this point, assume that User 5 connects to the conference bridge 12 (step 124), and a bearer path is established between the conference bridge 12 and the telephony terminal 30 of User 5 (step 126). User 5 will provide the access code for the personal conference bridge (step 128), and the conference bridge 12 will associate the connection with the personal conference bridge of User 5. User 5 may also enter a passcode, which identifies User 5 as the chairperson, or owner of the personal conference bridge (step 130). The conference bridge 12 will recognize User 5 as the chairperson and initiate the conference. Initiating the conference may entail stopping the playback of any music while the conference participants, User 1 and User 2, were on hold, and joining each of the bearer paths connecting to each of the telephony terminals 20, 22, 30 for users 1, 2, and 5, respectively, to facilitate the conference call (steps 132, 134, and 136).

Figure 3A:
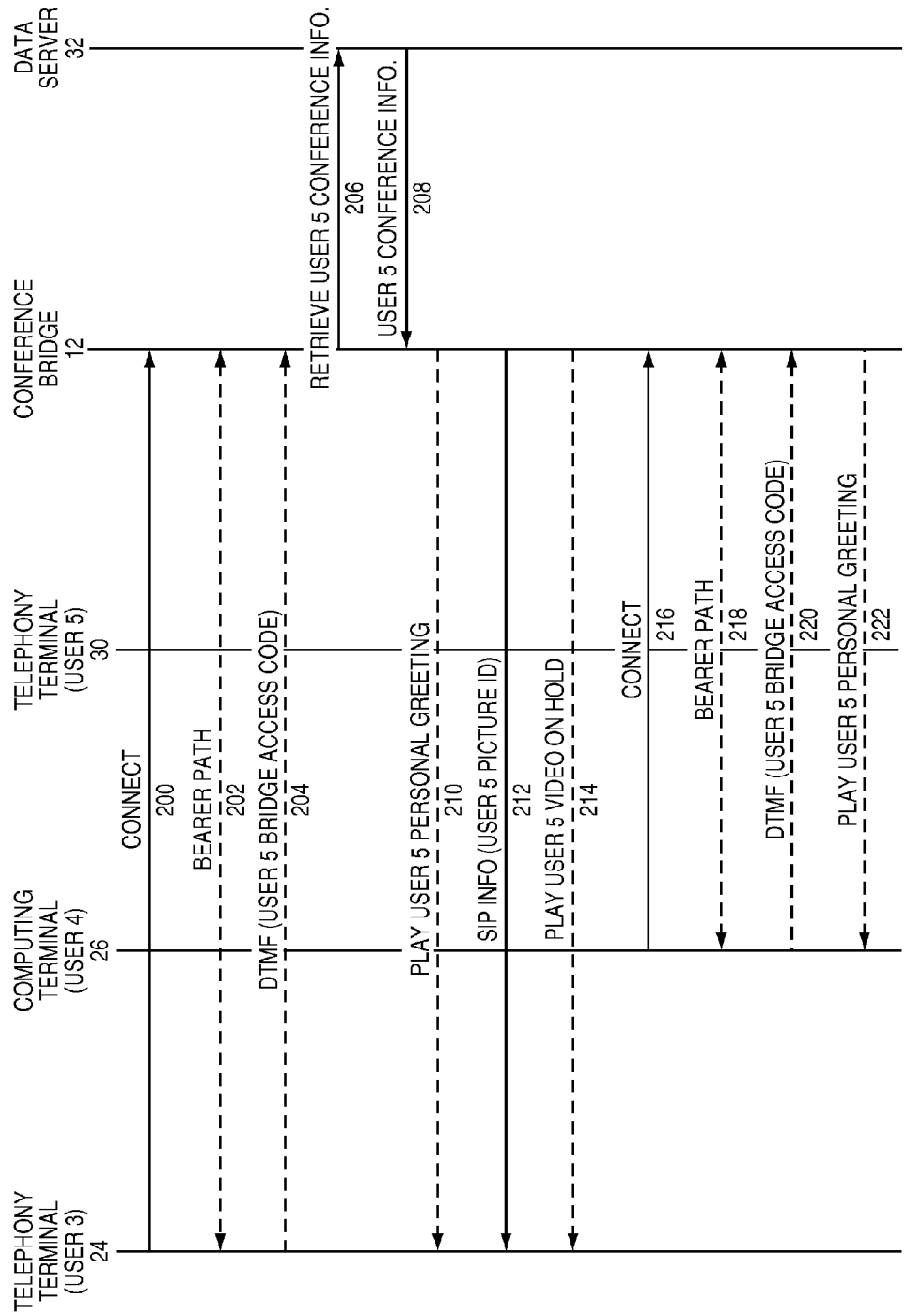
FIGS. 3A and 3B show a communication flow diagram illustrating operation of a second embodiment of the present invention.
Figure 3B:
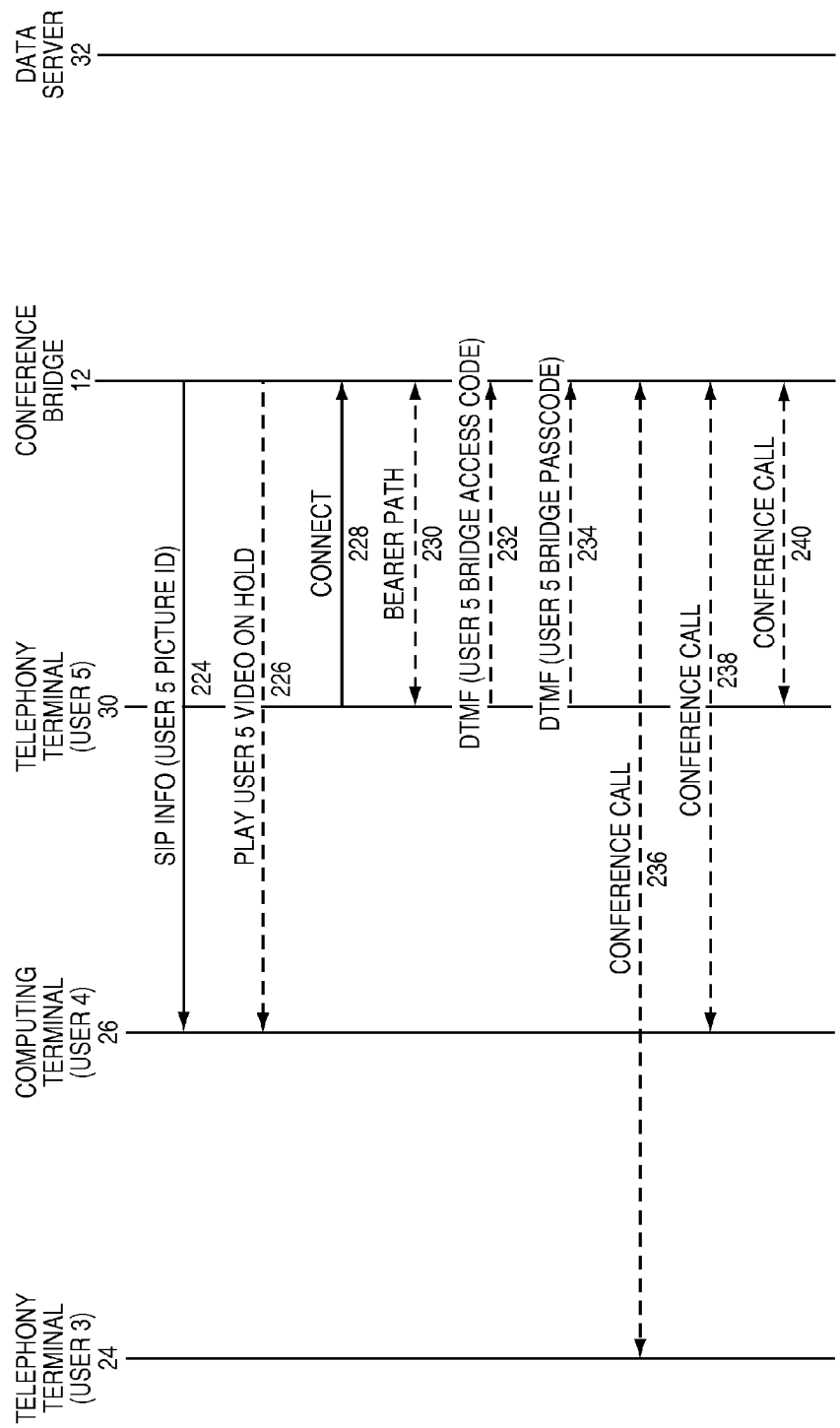

Turning now to FIGS. 3A and 3B, another communication flow is illustrated. In this example, the conference involves users 3, 4, and 5. The telephony terminals 24, 26, and 30 are assumed to have multimedia capability, and are supported by the VoIP network 14. The multimedia capability in this example includes presenting audio as well as displaying images and video to the respective users via the telephony terminals 24, 26. The conference information is again obtained from the data server 32; however, in this example the conference information includes a voice-based personal greeting, identification information for a picture of User 5, and a video, all of which were selected by User 5. All of this information may be retrieved from the data server 32 or from other sources based on information obtained from the data server 32.

Initially, assume that User 3 connects to the conference bridge 12 via telephony terminal 24 (step 200), and a bearer path is established therebetween (step 202). When the conference bridge 12 receives the access code, perhaps via DTMF tones, identifying the personal conference bridge for User 5 (step 204), the conference bridge 12 associates the connection with the personal conference bridge of User 5. The conference bridge 12 will send a message to the data server 32 to retrieve conference information for User 5 (step 206). The data server 32 will send the conference information for User 5 to the conference bridge 12 (step 208).

As noted, the conference information will include a personal greeting, identification of a picture for User 5, and a video to present to the conference participants. Accordingly, the conference bridge 12 will initially stream the personal greeting for User 5 to the telephony terminal 24 (step 210). Before, during, or after the personal greeting is delivered, the conference bridge 12 may deliver the identification information for the picture of User 5 to the telephony terminal 24 (step 212). Since the bearer path is essentially a packet-based communication session, the personal greeting may be delivered over the communication session, while control information, such as the identification of the picture of User 5, may be delivered within the communication session or in association with the communication session using any appropriate protocol, such as the Session Initiation Protocol (SIP). If SIP is employed, the identification information for the picture may be provided in a SIP Information (INFO) message. Upon receiving the identification information for the picture of User 5, the telephony terminal 24 may access the data server 32 or other entity to obtain the actual media content representing the picture or image of User 5 and present it to User 3 via the telephony terminal 24 or other associated communication terminal. After the personal greeting and picture identification are presented, the conference bridge 12 may deliver the video to User 3 via telephony terminal 24 (step 214).

A similar process is provided when User 4 accesses the personal conference bridge for User 5. As such, computing terminal 26 will connect to the conference bridge 12 (step 216), and a bearer path is established therebetween (step 218). Upon receiving the access code from User 4 via the computing terminal 26 (step 220), the conference bride 12 will begin playing the personal greeting for User 5 over the bearer path (step 222) as well as delivering the identification information for the picture of User 5 in a SIP INFO message to computing terminal 26 (step 224). As described above, the computing terminal 26 may use the identification for the picture of User 5 to obtain the actual content providing the picture or image of User 5 and present it to User 4. When the personal greeting is completed and the picture identification has been delivered, the conference bridge 12 may begin delivering the video to computing terminal 26 (step 226). Presentation of the personal greeting, the picture of User 5, and the video may take place sequentially or simultaneously, depending on the capabilities of the computing terminal 26 and the conference bridge 12, as well as the desires of the user.

At this point, assume that User 5 connects to the conference bridge 12 (step 228), and a bearer path is established between the conference bridge 12 and the telephony terminal 30 of User 5 (step 230). User 5 will provide the access code for the personal conference bridge (step 232), and the conference bridge 12 will associate the connection with the personal conference bridge of User 5. User 5 may also enter a passcode, which identifies User 5 as the chairperson, or owner of the personal conference bridge (step 234). The conference bridge 12 will recognize User 5 as the chairperson and initiate the conference. Initiating the conference may entail stopping the playback of any video while the conference participants, User 3 and User 4, were on hold, and joining each of the bearer paths connecting to each of the telephony terminals 24, 26, 30 for users 3, 4, and 5, respectively, to facilitate the conference call (steps 236, 238, and 240).

Figure 4A:
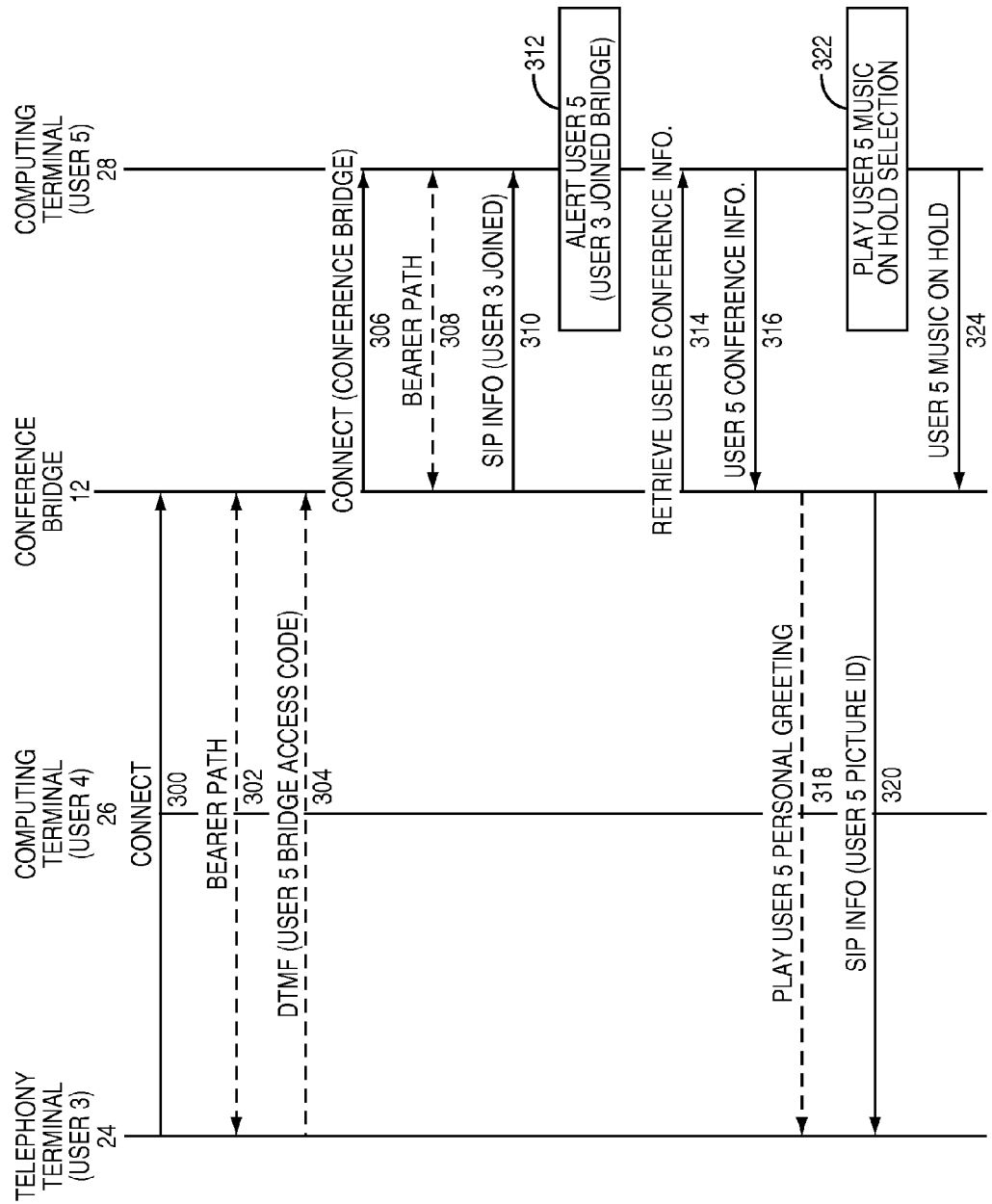
FIGS. 4A and 4B show a communication flow diagram illustrating operation of a third embodiment of the present invention.
Figure 4B:
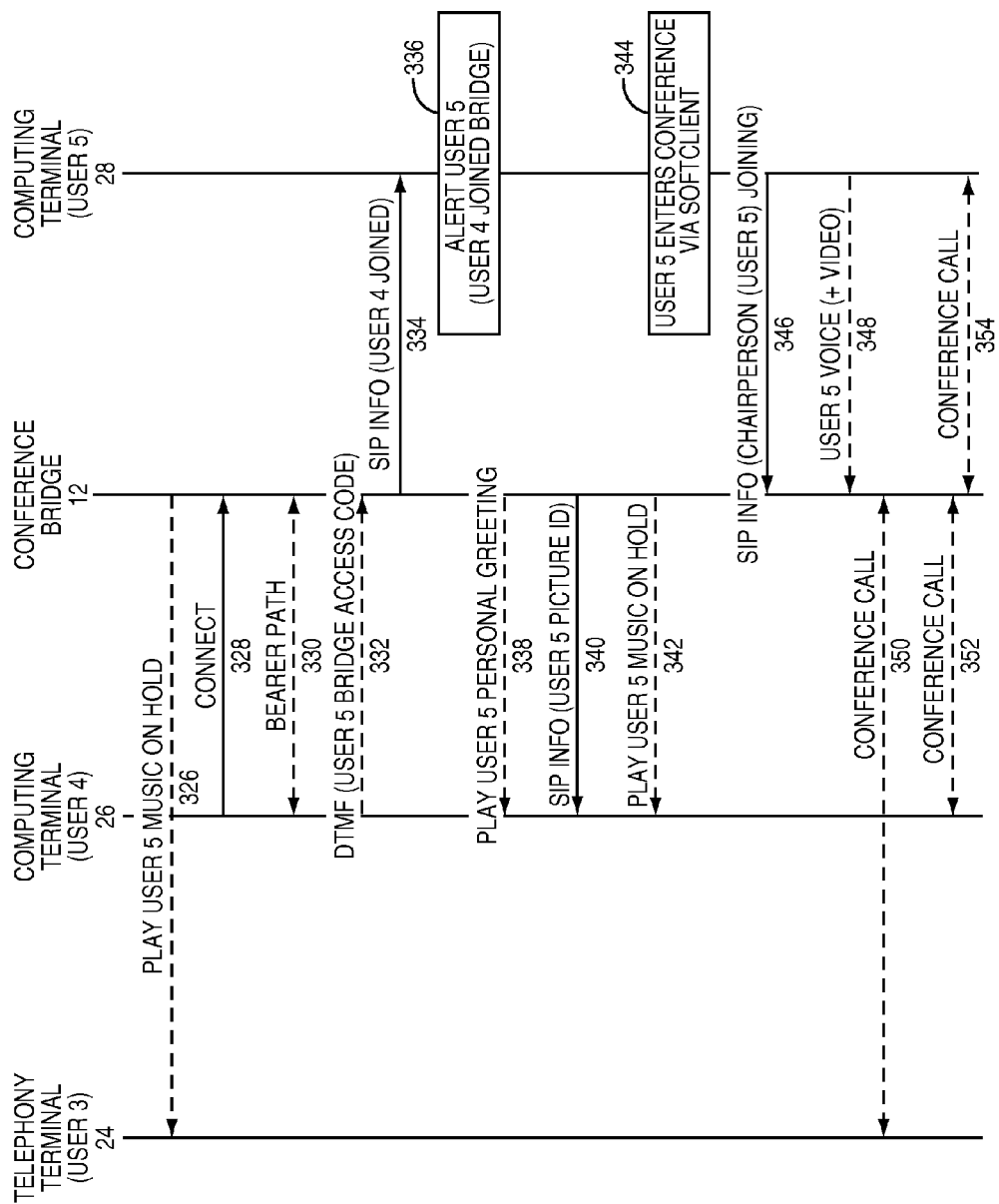

In the communication flow of FIGS. 4A and 4B, the conference bridge 12 is configured to obtain conference information from computing terminal 28, which is associated with User 5. Further, the computing terminal 28 is a multimedia compliant communication terminal that is capable of supporting voice communications, such that User 5 can participate in a conference via the computing terminal 28. In this example, the conference bridge 12 is configured to automatically connect computing terminal 28 to the personal conference bridge after one or more conference participants have accessed the personal conference bridge for a conference. The conference may be an audio conference or an audio conference associated with video conferencing.

Initially, assume telephony terminal 24 of User 3 connects to the conference bridge 12 (step 300), and a bearer path is established (step 302). Upon receiving an access code from User 3 (step 304), the conference bridge 12 will automatically connect computing terminal 28 into the conference bridge (step 306). As a result, a bearer path is established between the conference bridge 12 and the computing terminal 28 (step 308). The conference bridge 12 may be able to obtain caller identification information or other identification information from User 3, and provide a SIP INFO message to computing terminal 28 indicating that User 3 has joined a conference (step 310). The computing terminal 28 may provide an alert to User 5 that User 3 has joined a conference supported by the personal conference bridge (step 312).

Meanwhile, the conference bridge 12 may retrieve conference information from computing terminal 28 (step 314). The computing terminal 28 will provide the conference information for User 5 to the conference bridge 12 (step 316). Assuming the conference information includes a personal greeting, identification for a picture of User 5, and selected music, the conference bridge 12 will begin playing the personal greeting (step 318) and provide the identification for a picture of User 5 in a SIP INFO message to telephony terminal 24 (step 320).

In this example, the computing terminal 28 may maintain control of the particular information that is presented to the conference participants. As such, the computing terminal 28 may begin playing a "music on hold" selection (step 322), which is delivered to the conference bridge 12 (step 324), which in turn forwards the music on hold over the bearer path to the telephony terminal 24 (step 326). Thus, the conference bridge 12 is effecting delivery of the music on hold, while the computing terminal 28 acts as the source of the streaming content as well as the conference information used to control the interface presented to the conference participants.

Similarly, User 4 will connect to the conference bridge 12 via computing terminal 26 (step 328), and a bearer path is established between the conference bridge 12 and the computing terminal 26 (step 330). Upon receiving the access code from User 4 (step 332), the conference bridge 12 will associate the connection with the personal conference bridge of User 5 and send a SIP INFO message to the computing terminal 28 to indicate that User 4 has joined the conference (step 334). The computing terminal 28 may provide an alert to User 5 indicating that User 4 has joined the conference (step 336).

Meanwhile, the conference bridge 12 will provide the personal greeting to computing terminal 26 (step 338) as well as deliver the identification information for the picture of User 5 in a SIP INFO message (step 340). Once the personal greeting is complete, the conference bridge 12 may begin streaming the music on hold to computing terminal 26 for presentation to User 4 (step 342). Notably, since the computing terminal 28 is streaming the music on hold content, the conference bridge 12 may present the music on hold in progress to User 4. In other words, the conference bridge 12 may simply begin replicating the packets received from the computing terminal 28 to computing terminal 26 and telephony terminal 24 when User 4 joins the conference.

At this point, users 3 and 4 are on hold. When User 5 decides to join the conference, User 5 may enter the conference via a softclient, which is a communication application running on the computing terminal 28 (step 344). Since the computing terminal 28 is already connected to the personal conference bridge provided by the conference bridge 12, the computing terminal 28 may only need to send a SIP INFO message or the like to indicate that the chairperson is joining the conference (step 346). The conference bridge 12 will recognize User 5 as the chairperson and begin receiving voice and associated video from the computing terminal 28 for a video conference (step 348). At this point, the conference bridge 12 will join each of the users 3, 4, and 5 into the conference (steps 350, 352, and 354).

Figure 5:
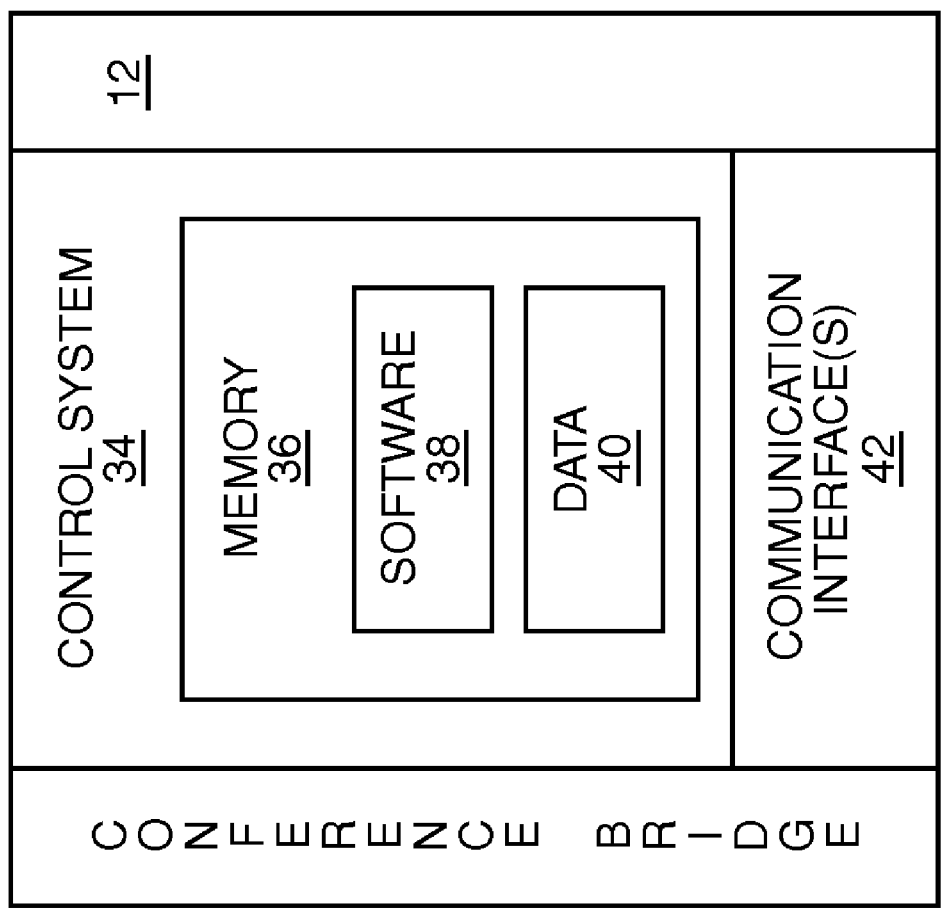
FIG. 5 is a block representation of a conference bridge according to one embodiment of the present invention.

With reference to FIG. 5, a block representation of a conference bridge 12 is illustrated according to one embodiment of the present invention. The conference bridge 12 includes a control system 34 having sufficient memory 36 for the requisite software 38 and data 40 to operate as described above. The control system 34 is also associated with one or more communication interfaces 42 to facilitate communications with the various communication terminals as well as with other communication nodes directly or indirectly associated with the any of the communication networks. The conference bridge 12 may represent a single personal conference bridge or a system capable of supporting multiple personal conference bridges.

Figure 6:
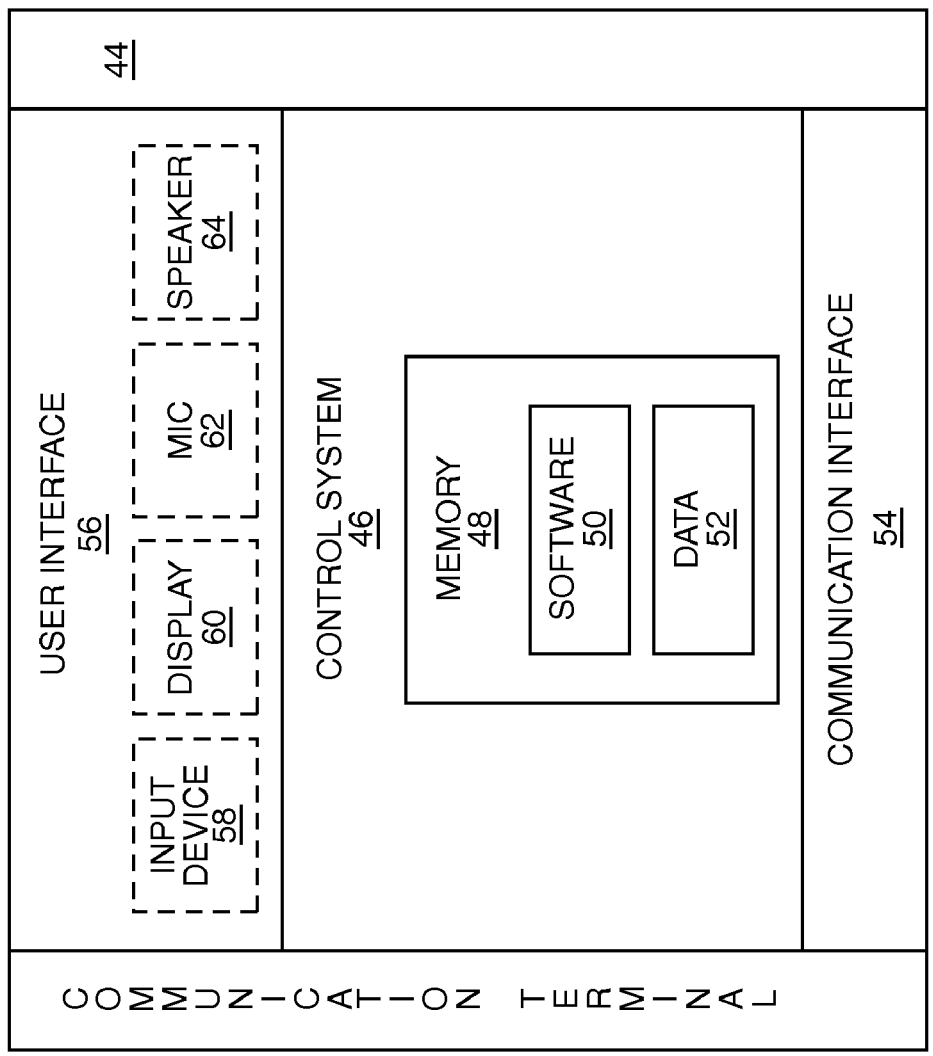
FIG. 6 is a block representation of a communication terminal according to one embodiment of the present invention.

With reference to FIG. 6, a block representation of a communication terminal 44, such as the telephony terminals 20, 22, 24, 26, and 30 or the computing terminal 28, is depicted. The communication terminal 44 may include a control system 46 having sufficient memory 48 for the requisite software 50 and data 52 to operate as described above. The control system 46 may be associated with a communication interface 54 to facilitate communications directly or indirectly with the conference bridge 12 or other communication nodes, as well as a user interface 56 to facilitate interaction with one or more users associated with the communication terminal 44. The user interface 56 may include an input device 58, display 60, microphone (MIC) 62, and speaker 64, to facilitate bidirectional audio communications, including voice, as well as provide information to the user and receive information from the user.

Those skilled in the art will recognize improvements and modifications to the preferred embodiments of the present invention. All such improvements and modifications are considered within the scope of the concepts disclosed herein and the claims that follow.

What is claimed is:

1. A method for customizing a personal conference bridge comprising:

providing access to a personal conference bridge for at least one conference participant, the personal conference bridge associated with a user;

accessing conference information selected by the user upon providing access to the personal conference bridge for the at least one conference participant; and delivering the conference information to at least one communication terminal associated with the at least one conference participant, wherein the conference information delivered to the at least one conference participant is customized by the user, and wherein the conference information delivered to the at least one conference participant is based on the at least one conference participant, such that different conference participants receive different conference information of a conference call from the user.

2. The method of claim 1 wherein the conference information comprises media content to be presented to the at least one conference participant by the at least one communication terminal.

3. The method of claim 1 wherein the conference information comprises access information for media content to be presented to the at least one conference participant by the at least one communication terminal, such that the at least one communication terminal accesses the media content using the access information.

4. The method of claim 1 wherein the conference information comprises first media content to be presented to the at least one conference participant by the at least one communication terminal, and access information for second media content to be presented to the at least one conference participant by the at least one communication terminal, such that the at least one communication terminal accesses the second media content using the access information.

5. The method of claim 1 wherein the conference information comprises at least one of a group consisting of first media content to be presented to the at least one conference participant by the at least one communication terminal and access information for second media content to be presented to the at least one conference participant by the at least one communication terminal, such that the at least one communication terminal accesses the second media content using the access information, the first or second media content comprising at least one of a group consisting of text, graphics, image, voice, audio, or video content.

6. The method of claim 1 wherein the conference information is accessed from a server apart from the personal conference bridge.

7. The method of claim 1 wherein the conference information is accessed from a communication terminal associated with the user.

8. The method of claim 1 further comprising:
providing access to the personal conference bridge for the user; and
effecting a media conference between the at least one conference participant and the user.

9. The method of claim 8 wherein providing access to the personal conference bridge for the user is initiated by sending a message to join the personal conference bridge to a communication terminal associated with the user.

10. The method of claim 8 wherein the media conference is an audio conference allowing the at least one conference participant and the user to communicate with each other via voice communications.

11. The method of claim 1 further comprising, upon providing access to the personal conference bridge for the at least one conference participant, placing the at least one conference participant on hold prior to effecting a conference between conference participants and wherein at least a portion of the conference information is delivered to the at least one communication terminal associated with the at least one conference participant while the at least one conference participant is on hold.

12. The method of claim 1 wherein the conference information is streamed from a remote node through the personal conference bridge to the at least one conference participant.

13. The method claim 1 wherein different conference information is provided to at least two different conference participants.

14. A conference system providing a customizable personal conference bridge comprising:
   at least one communication interface; and
   a control system associated with the at least one communication interface and adapted to:
      provide access to a personal conference bridge for at least one conference participant, the personal conference bridge associated with a user;
      access conference information selected by the user upon providing access to the personal conference bridge for the at least one conference participant; and
      deliver the conference information to at least one communication terminal associated with the at least one conference participant, wherein the conference information delivered to the at least one conference participant is customized by the user, and wherein the conference information delivered to the at least one conference participant is based on the at least one conference participant, such that different conference participants receive different conference information of a conference call from the user.

15. The conference system of claim 14 wherein the conference information comprises media content to be presented to the at least one conference participant by the at least one communication terminal.

16. The conference system of claim 14 wherein the conference information comprises access information for media content to be presented to the at least one conference participant by the at least one communication terminal, such that the at least one communication terminal accesses the media content using the access information.

17. The conference system of claim 14 wherein the conference information comprises first media content to be presented to the at least one conference participant by the at least one communication terminal, and access information for second media content to be presented to the at least one conference participant by the at least one communication terminal, such that the at least one communication terminal accesses the second media content using the access information.

18. The conference system of claim 14 wherein the conference information comprises at least one of a group consisting of first media content to be presented to the at least one conference participant by the at least one communication terminal and access information for second media content to be presented to the at least one conference participant by the at least one communication terminal, such that the at least one communication terminal accesses the second media content using the access information, the first or second media content comprising at least one of a group consisting of text, graphics, image, voice, audio, or video content.

19. The conference system of claim 14 wherein the conference information is accessed from a server apart from the personal conference bridge.

20. The conference system of claim 14 wherein the conference information is accessed from a communication terminal associated with the user.

21. The conference system of claim 14 wherein the control system is further adapted to:
   provide access to the personal conference bridge for the user; and
   effect a media conference between the at least one conference participant and the user.

22. The conference system of claim 21 wherein to initiate providing access to the personal conference bridge for the user, the control system is adapted to send a message to join the personal conference bridge to a communication terminal associated with the user.

23. The conference system of claim 21 wherein the media conference is an audio conference allowing the at least one conference participant and the user to communicate with each other via voice communications.

24. The conference system of claim 14 wherein upon providing access to the personal conference bridge for the at least one conference participant, the control system is further adapted to place the at least one conference participant on hold prior to effecting a conference between conference participants and wherein at least a portion of the conference information is delivered to the at least one communication terminal associated with the at least one conference participant while the at least one conference participant is on hold.

25. The conference system of claim 14 wherein the conference information is streamed from a remote node through the personal conference bridge to the at least one conference participant.

26. The conference system claim 14 wherein different conference information is provided to at least two different conference participants.

27. A network comprising:
   means for providing access to a personal conference bridge for at least one conference participant, the personal conference bridge associated with a user;
   means for accessing conference information selected by the user upon providing access to the personal conference bridge for the at least one conference participant; and
   means for delivering the conference information to at least one communication terminal associated with the at least one conference participant, wherein the conference information delivered to the at least one conference participant is customized by the user, and wherein the conference information delivered to the at least one conference participant is based on the at least one conference participant, such that different conference participants receive different conference information of a conference call from the user.

* * * * *